J. A. V. ZIELFELDT.
FLY CATCHER.
APPLICATION FILED JULY 23, 1913.
1,087,058.
Patented Feb. 10, 1914.
2 SHEETS—SHEET 1.
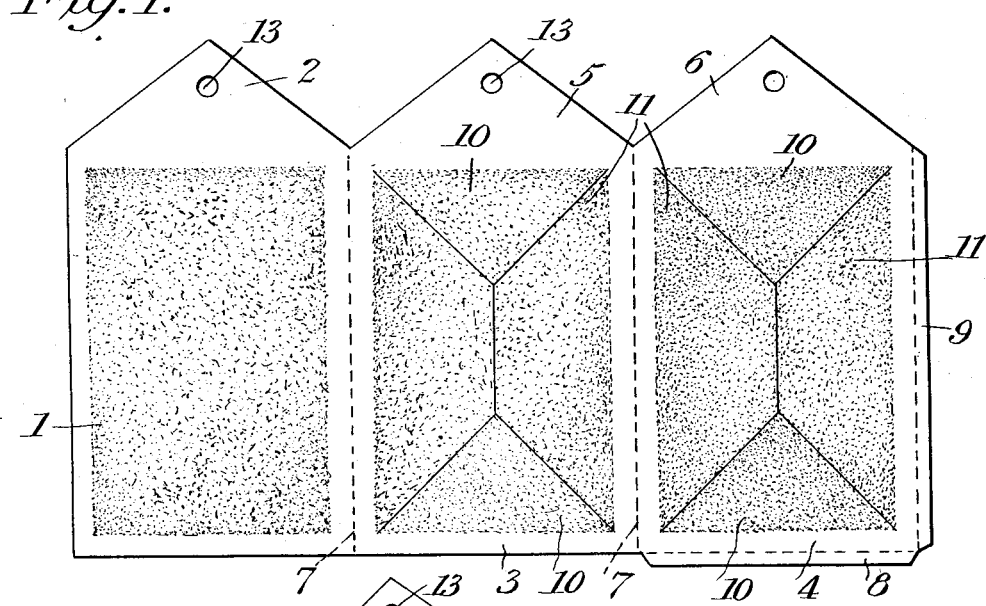
Fig. 1.
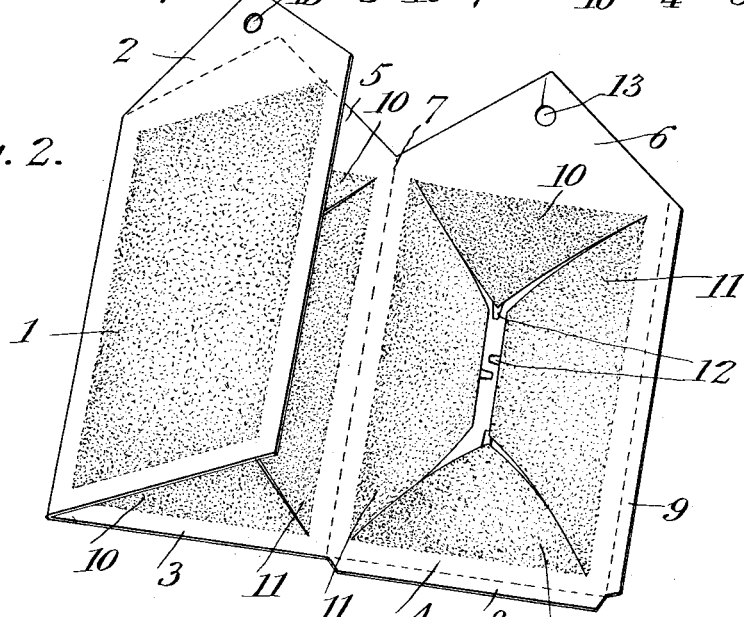
Fig. 2.
Fig. 4.
Witnesses
Fenton S. Belt
H. Joseph Doyle
Inventor
J. A. V. Zielfeldt.
By
Attorney

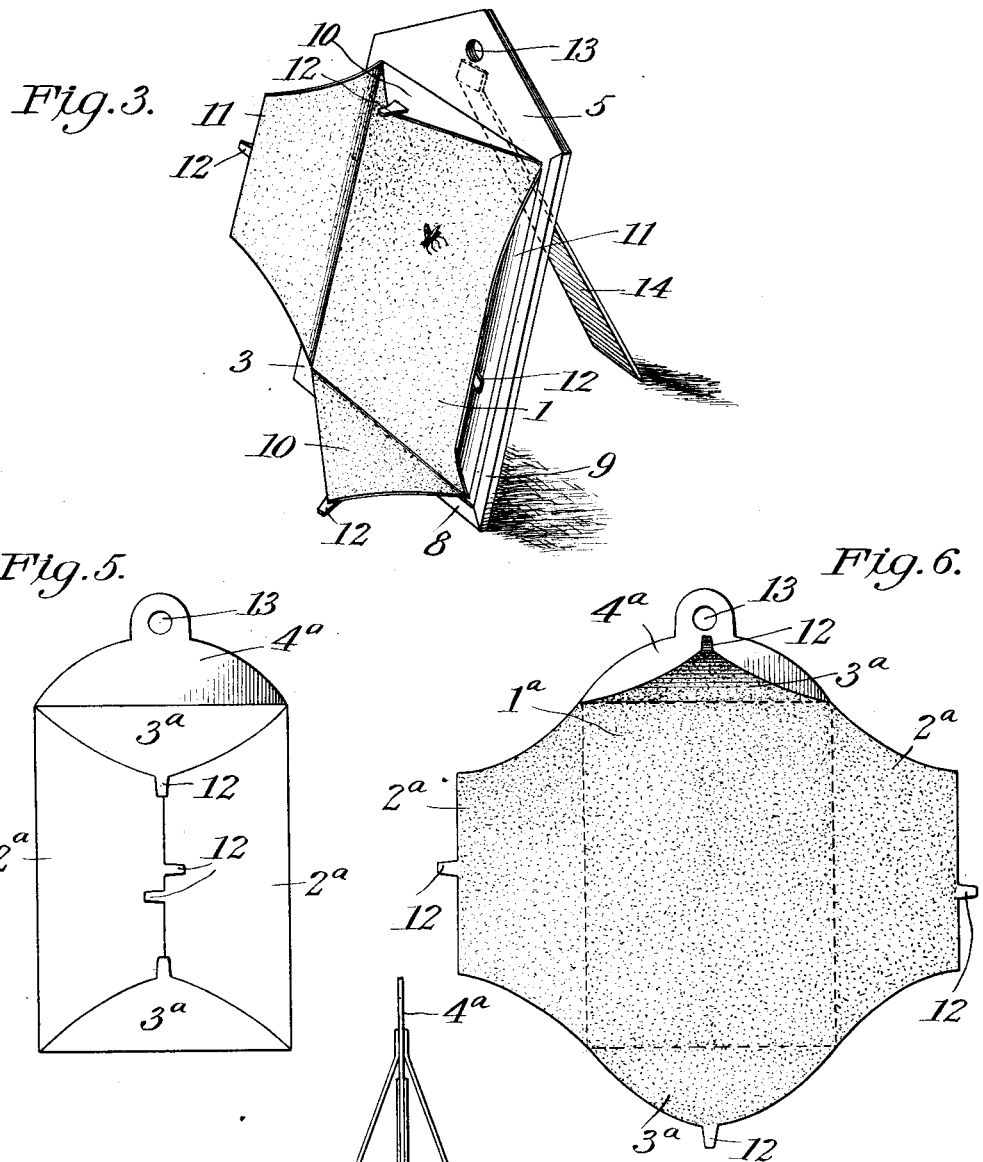

UNITED STATES PATENT OFFICE.

JOHN A. V. ZIELFELDT, OF BRIDGEPORT, CONNECTICUT.

FLY-CATCHER.

1,087,058.  Specification of Letters Patent.  Patented Feb. 10, 1914.

Application filed July 23, 1913. Serial No. 780,660.

*To all whom it may concern:*

Be it known that I, JOHN A. V. ZIELFELDT, a citizen of the United States, residing in the city of Bridgeport, county of Fairfield, State of Connecticut, have invented certain new and useful Improvements in Fly-Catchers; and I do declare the following to be a full, clear, and exact description of the invention, such as will enable others skilled in the art to which it appertains to make and use the same.

This invention relates to the subject of insect catchers of the type generally known as "sticky fly paper," and the primary aim of the invention is to provide an insect catcher in which the adhesive portion of the same can be inclosed when not in use.

The invention also aims to provide a simple means whereby the catcher can be suspended, used as a stand, or spread in the form of a sheet, in either insance, the catcher presenting a large area of adhesive-coated surface for the reception of insects.

In producing an insect destroyer capable of being used as stated above, it will be obvious that the same may be embodied in various forms, a few simple and practical examples of the same being shown in the accompanying drawings wherein—

Figure 1 is a plan view of the improved insect catcher. Fig. 2 is a perspective view, shown partly folded. Fig. 3 is a perspective view showing the catcher used as an easel. Fig. 4 is a transverse sectional view showing the catcher folded. Fig. 5 is a plan view of a variation of the invention, shown folded. Fig. 6 is a view of the catcher illustrated in Fig. 5, the same being shown open. Fig. 7 is a view in elevation showing the catcher used as a stand.

Referring to the accompanying drawings by numerals, and particularly to the forms illustrated in Figs. 1, 2 and 3, it will be seen that the improved insect catcher may be formed from a single sheet of paper which may be either stiff or flexible, and this sheet is so shaped as to form the body portion 1 at one end that is coated centrally on both sides with adhesive material and at its top is equipped with a projecting portion 2 that is preferably triangular in shape. Adjoining the body 1 is a cover 3, and adjoining the cover 3 is another cover 4, both covers being coated centrally with adhesive material on their inner surfaces, and both covers being equipped with uncoated top projections that are duplicates of the top projection 2 of body 1, said projections of the covers being designated, respectively, by the numerals 5 and 6.

The body 1 and the covers 3 and 4 are the same in size and shape and they are separated by uncoated portions that are centrally divided by the longitudinally extending fold lines 7 by means of which the covers 3 and 4 may be readily folded over the body 1 to entirely inclose said body, as is shown in Fig. 4, the cover 4 being provided at the bottom and one longitudinal edge with the sealing strips 8 and 9 which may be attached to cover 3 to form a compact package.

The covers 3 and 4 are provided with central longitudinal slits and also with upper and lower slits that extend from the ends of the central slits to the corners of the adhesive coated portions of said covers. These slits are so arranged that they provide end and side flaps 10 and 11 in each cover which may be opened, as suggested in Fig. 3 to expose the coated portion of body 1 and the coated portions of said flaps. To facilitate opening the flaps 10 and 11, they may be provided with finger grips or tabs 12.

The insect catcher may be used in various ways, as will be readily apparent. For instance, it may be spread out flat, or suspended from an overhead support by cords or the like that may be attached to one or more of the openings 13 in the top projections of the body 1 and covers 3 and 4. Or, as suggested in Fig. 3, it may be used as an easel, in which but one side of the body 1 is exposed, the catcher being supported by a leg 14 which may be of paper and have its upper end pasted or otherwise attached to the upper projection of the cover 4.

In the form of the invention illustrated in Figs. 5 and 6 the body 1$^a$ may have the covers which are in the form of side and end flaps 2$^a$ and 3$^a$ at both the front and rear, or at one surface only, and these covers may be readily opened as is suggested in Fig. 6. In this form of the invention the cover flaps may be opened and the device suspended from an overhead support, such as a chandelier or the like. In the form of the invention illustrated in Figs. 5 and 6 the body 1$^a$ is preferably comparatively stiff, while the covers are flexible.

The form of the invention illustrated in Figs. 5 and 6 may be used as a stand, as is suggested in Fig. 7, wherein side legs 15 are pasted or otherwise attached to opposite sides of the top projection 4ª of body 1ª, in which position by opening the covers 2ª and 3ª a large area of coated surface is provided.

From the foregoing description it will be readily seen that this invention, by means of the covers, provide simple and practical means whereby the adhesive coated portions of the body may be entirely covered when not in use, yet when desired, the same can be readily opened so that a large or a small area of the adhesive coated surfaces may be exposed. And by utilizing the various expedients described, the catcher can be used suspended, spread out, as an easel, a stand, and in various other ways.

I claim as my invention:

1. An insect catcher comprising a body coated on its front and rear with adhesive material, and front and rear covers for the body each provided with flaps having a coating of adhesive material and adapted to be opened to expose the front and rear of the body.

2. An insect catcher formed from a single sheet of material and comprising a body provided with front and rear coatings of adhesive material, said body having an uncoated top extension, covers for the body having their inner surfaces coated with adhesive material, said covers having uncoated top extensions, the coated portions of the covers being slitted to provide side and end flaps, said covers being adapted to be folded over the body, and one of said covers being provided with means for retaining the covers in folded positions.

3. An insect catcher comprising a body provided with a coating of adhesive material, and a cover for the body having one surface provided with a coating of adhesive material, said cover being slitted to provide end and side flaps adapted to be opened to expose the adhesive material on the body.

4. An insect catcher comprising a body having its front and rear surfaces coated with adhesive material, front and rear covers for the body, each cover being coated with adhesive material on its inner surface and each cover being slitted to provide flaps adapted to be opened to expose their coated surfaces and also to expose the coated surfaces of the body.

5. An insect catcher formed of a single sheet of material having a body provided with a coating of adhesive material, and covers for the body having their inner surfaces coated with adhesive material, said covers being adapted to be folded over the body, and one of said covers having sealing strips for retaining the covers folded over the body.

6. An insect catcher comprising a body coated on its front and rear surfaces with adhesive material, and front and rear covers for the body having their inner surfaces coated with adhesive material and provided with flaps adapted to be opened to expose the adhesive material on the flaps and to expose the front and rear of the body.

7. An insect catcher comprising a body provided with front and rear coatings of adhesive material, covers for the body having their inner surfaces coated with adhesive material, the coated portions of the covers being slitted to provide side and end flaps, said covers being adapted to be folded over the body and the flaps being adapted to be opened to expose the coated surfaces of the body, one of said covers being provided with means for retaining the covers in folded positions.

8. An insect catcher comprising a body having front and rear surfaces coated with adhesive material, a cover for each of said surfaces, said covers being coated with adhesive material on their inner surfaces, and each cover including flaps adapted to be opened to expose their coated inner surfaces and also to expose the coated surfaces of the body.

In testimony whereof I affix my signature in presence of two witnesses.

JOHN A. V. ZIELFELDT.

Witnesses:
F. W. SMITH, Jr.,
M. T. LONGDEN.

Copies of this patent may be obtained for five cents each, by addressing the "Commissioner of Patents, Washington, D. C."